M. CROHN.
SCARF PIN FASTENER.
APPLICATION FILED JUNE 24, 1912.

1,054,178.

Patented Feb. 25, 1913.

Witnesses:
William Miller
Christian H. Almstaedt

Inventor
Marcus Crohn
By his Attorneys
Hauff & Barland

COLUMBIA PLANOGRAPH CO., WASHINGTON, D. C.

UNITED STATES PATENT OFFICE.

MARCUS CROHN, OF NEW YORK, N. Y.

SCARF-PIN FASTENER.

1,054,178.   Specification of Letters Patent.   Patented Feb. 25, 1913.

Application filed June 24, 1912. Serial No. 705,679.

*To all whom it may concern:*

Be it known that I, MARCUS CROHN, a citizen of the United States, residing at New York, county of New York, State of New York, have invented new and useful Improvements in Scarf-Pin Fasteners, of which the following is a specification.

This invention relates to a fastening device which is particularly adapted for insertion onto the stem of a scarf pin, the object being to prevent surreptitious or accidental withdrawal of the pin from a scarf or other article.

The device is inexpensive, has few parts and the gripping members can be readily released by pressing the projecting portion of a tube downward. The gripping members are swingingly mounted on the tube and are forced to contact with the inner tapered portion of a tubular casing or shell thus firmly clamping the casing and the tube to the stem of the pin.

Figure 1:
Figure 2:
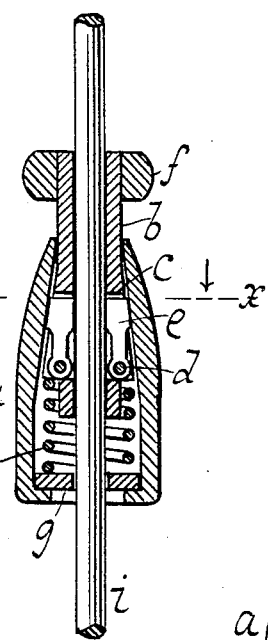
Figure 3:
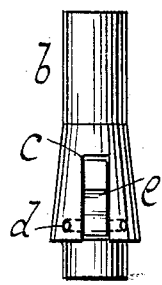
Figure 4:
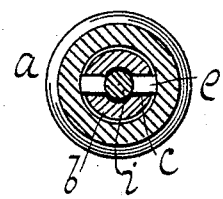

The novel features of the invention are more fully described in the following specification and claim and illustrated in the accompanying drawing in which:

Figure 1 represents a front elevation of a scarf pin embodying this invention. Fig. 2 is a vertical longitudinal section of the fastener on a larger scale. Fig. 3 is a detail view of a tube. Fig. 4 is a transverse horizontal section taken along the line *x x* of Fig. 2.

The fastening device consists of a tubular casing or shell *a* the inner wall of which is tapered to form a contracted top. In this casing is arranged a tube *b* having slots *c* extending longitudinally along the tube. Each slot forms a recess in the wall of the tube for swingingly mounting at *d* a clamping member or dog *e*. The tube *b* projects upward out of the casing and the top thereof is provided with a finger button *f*. The bottom of the casing is closed by a disk or diaphragm *g* of suitable construction to support a spring *h* which serves to force the tube to the tapered part of the casing. Consequently the heads of the dogs are pressed by the tapered wall against the periphery of the stem of a scarf pin *i* and the fastener is thus fixed securely to the pin. It will be noticed that a portion of the tube is flared so as to limit the upward movement and prevent the tube from being pulled out of or displaced from the tubular casing.

When it is desired to remove the device from the pin the upper end of the tube is pushed downwardly and the dogs being thereby carried to a wider part of the casing will oscillate out of engagement with the pin and the latter can be moved longitudinally out of the sleeve. It will be readily understood that one or more of the gripping members or dogs may be employed, two being sufficient as shown to securely grip the pin.

I claim:

A scarf pin fastener comprising an interiorly tapered casing to form a contracted open top, a diaphragm secured to the lower part of the case, a tube slidably arranged in and projecting from the upper part of the casing, a push button secured to the upper end of the tube, the said tube having a lower flaring portion provided with longitudinal slots, a dog pivoted in each slot, a spring located between the diaphragm and the lower end of the tube to force the latter upward into the tapered part of the casing and swing the dogs toward the axis of the tube to securely grip the stem of the pin.

In testimony whereof I have hereunto set my hand in the presence of two subscribing witnesses.

MARCUS CROHN.

Witnesses:
CHRISTIAN N. ALMSTAEDT,
HAZEL V. MCELROY.

---

Copies of this patent may be obtained for five cents each, by addressing the "Commissioner of Patents, Washington, D. C."